May 1, 1928. 1,668,185
G. T. ALLEN
CONCRETE MIXING MACHINE
Filed Aug. 29 1927 2 Sheets-Sheet 1
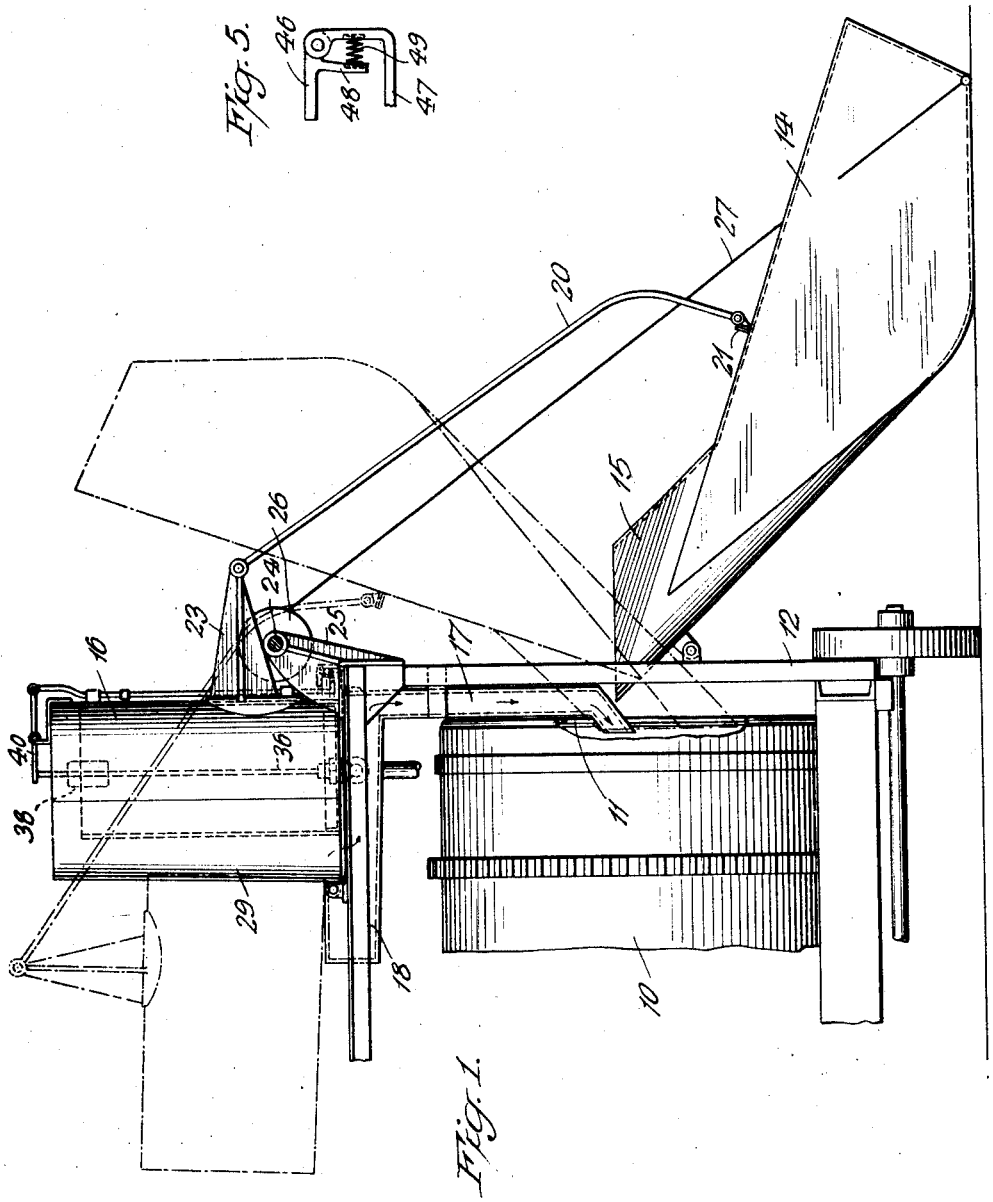
INVENTOR.
George T. Allen.
BY
Williams & Morse
ATTORNEYS.

May 1, 1928.
G. T. ALLEN
1,668,185
CONCRETE MIXING MACHINE
Filed Aug. 29, 1927
2 Sheets-Sheet 2
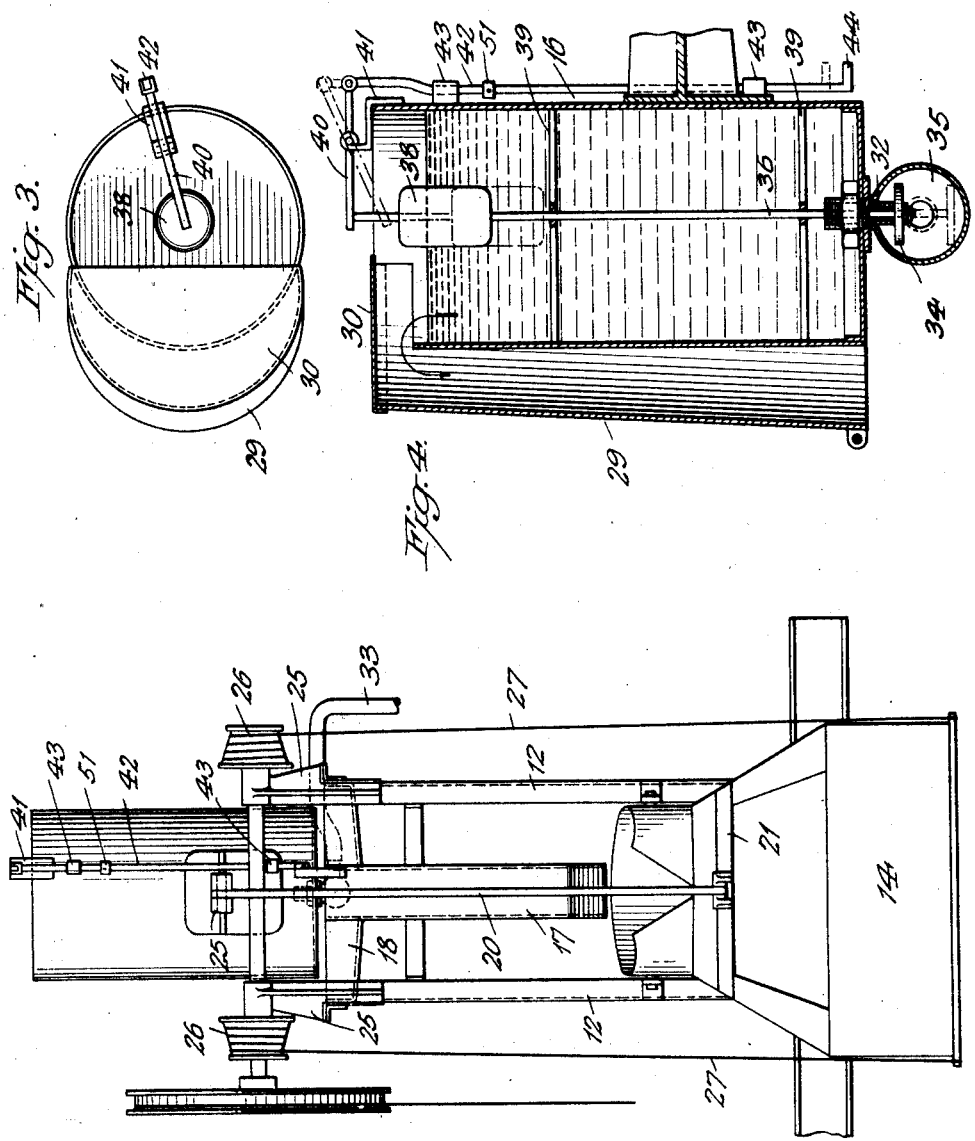
INVENTOR.
George T. Allen.
BY
Williams & Moore,
ATTORNEYS.

Patented May 1, 1928.

1,668,185

UNITED STATES PATENT OFFICE.

GEORGE T. ALLEN, OF DUNELLEN, NEW JERSEY.

CONCRETE-MIXING MACHINE.

Application filed August 29, 1927. Serial No. 216,002.

This invention relates to concrete mixing machines of the type employing a rotatable mixing drum into which the charging materials are introduced from a tilting batch hopper, and into which water is periodically introduced in predetermined quantities from a measuring tank connected to and adapted to receive its supply of water from a suitable source.

The general object of the present invention is to provide a new and improved machine of the character mentioned, and more particularly to provide a new and improved means for properly supplying measured quantities of water to the mixing drum along with each charge.

The invention will be understood from the following description, taken in connection with the accompanying drawings, in which Figure 1 is a fragmental side elevation of a machine embodying the invention; Figure 2 is an end view of the machine as viewed from the right in Figure 1; Figure 3 is a plan view of the measuring tank; Figure 4 is a vertical sectional view of the tank and inlet valve therefor; and Figure 5 is a detail view, showing in elevation a part of the valve trip mechanism.

Referring to the drawings, the numeral 10 indicates a rotatable mixing drum, provided with an inlet opening 11 and adapted to be driven from a suitable power source, not shown.

To one side of the frame 12 of the truck upon which the mixing frame is mounted, is pivotally connected a batch hopper 14, adapted to receive the charging materials, such as cement and sand and the like, and deliver them to the mixing drum 10. The discharge spout 15 of the batch hopper 14 is so related to the mixing drum 10 that it projects into the inlet opening 11 thereof, when the hopper is lifted to its discharge position indicated in dotted lines in Figure 1, whereby the materials carried within the hopper are directed into the mixing drum. When the batch hopper 14 is in its lowered or filling position, as shown in full lines in Figure 1, the discharge end of the spout 15 is in a retracted position with respect to the mixing drum 10.

Upon the frame 12 is pivotally mounted a measuring tank 16, adapted for the reception of water which when the tank is dumped, is directed into the mixing drum 10 through a conduit 17, carried by the frame 12 and having its discharge end projecting into the inlet opening 11 of the mixing drum. The conduit 17 is connected at its upper end to a horizontally disposed pan or trough 18, carried by the frame 12 and located directly beneath the tank 16, so as to receive the dumped contents of such tank. The tank 16 is preferably so connected with the batch hopper 14 that, when the hopper is raised to its discharge position, the tank is tipped to its dumping position indicated in dotted lines in Figure 1; and conversely, when the batch hopper is lowered to its full line position, the tank is returned to its upright or filling position. The means shown for effecting such simultaneous operation of the batch hopper 14 and tank 16, includes a link 20, pivotally connected at its lower end to a transverse frame member 21 carried by the batch hopper 14, and at its upper end to an arm 23 secured to the tank 16 and projecting therefrom. For raising and lowering the batch hopper 14, a suitable windlass, adapted to be connected to a suitable source of power, may be employed, such windlass being herein shown as including a transverse shaft 24 journaled in bearings 25 carried by the frame 12, the opposite ends of the shaft 24 being provided with drums 26 carrying cables 27 which are anchored to the batch hopper.

The tank 16 is provided exteriorly with a deflecting wall 29 which forms with the tank a passage open at its lower end and communicating at its upper end with the upper end of the tank, the lower end of such passage being so located with respect to the pan 18 that the water, as it is dumped from the tank, is directed into such pan. In order to insure the water against spilling from the upper or open end of the tank when such tank is dumped, a baffle or guard plate 30 is provided, such guard plate being connected to the upper end of the deflecting guard 29 and overlying the upper end of the tank 16, as shown most clearly in Figures 3 and 4.

The bottom of the tank 16 is provided with a water inlet valve comprising a chamber 32 adapted to be connected to a suitable source of water supply through a flexible hose 33, the passage from said chamber to the tank being controlled by a valve disc 34. The valve disc 34 is carried by a vertically disposed valve stem 36, which projects upwardly into the tank and at its upper end is provided with a float 38 adapted for vertical adjustment on the valve stem so that the quantity of water which is allowed to enter the tank 16 may be regulated by adjusting the position of said float on the valve stem. The valve stem 36 may be vertically supported within a pair of guides 39 secured to the inner wall of the tank 16 in a spaced relation to each other.

After the valve disc 34 has been raised nearly to its closing position by the float 38, it is closed and held closed, even after the contents of the tank have been dumped, by the water pressure within the pressure chamber 35; and in order to open this valve as the tank returns to its filling position, a valve trip mechanism is provided. This valve trip mechanism may include a rocker arm 40 pivoted intermediate its ends to a bracket 41 secured to the upper end of the tank 16, one end of the arm 40 being adapted to engage the upper end of the valve stem 36 and the other end of such arm being pivotally connected to a vertically movable actuating rod 42. This actuating rod 42 is slidably mounted within guides 43 secured to the outer wall of the tank 16 and provided at its lower end with a projecting foot 44, adapted to engage a trip lug 46, pivotally mounted upon a bracket 47 which is secured to the frame 12. The trip lug 46 is provided with a lug 48 which is adapted to engage a spring 49 carried by the bracket 47. This spring 49 is sufficiently strong to hold the trip lug 46 against movement when the foot 44 first engages the trip lug, with the result that as the tank approaches its normal or filling position, the rod 42 is moved upwardly, thereby forcing the outer end of the lever 40 downwardly and thus opening the valve 33. After the valve 33 has been opened, a collar 51 carried by the rod 42 engages the upper guide 43, with the result that the rod 42 is prevented from further movement, whereupon the foot 44, acting on the trip lug 46, compresses the spring 49 a sufficient distance to permit the foot 44 to ride over the projecting end of the trip lug 46. As the foot 44 passes over the end of the trip lug 46, the rod 42 is permitted to drop by gravity, thus lifting the outer end of the lever 40 clear of the upper end of the valve stem 36 so as to permit such valve stem to freely rise by the buoyancy of the water upon the float as the tank 16 is being filled. As the tank is dumped, the foot 44 engages the trip lug 46 and slightly lifts the same out of the path of upward travel of the foot 44. After the foot 44 has cleared the trip lug 46 during the dumping of the tank 16, the trip lug moves by gravity back to its normal or reset position ready to engage the foot 44 and trip valve 33 as the tank is again returned to its filling position.

From the foregoing, it will be apparent that while the batch hopper 14 is in its lowered position and is being filled with the charging material, the tank 16 will be filling with the proper amount of water, determined by the setting of the float 38 on the valve stem 36, the inlet valve of course being of sufficient size to permit the filling of the tank during the time required for loading the hopper 14. When the hopper is raised for the purpose of injecting the charge into the mixing drum 10, the tank 16 is simultaneously tipped with the result that the water therein is quickly dumped through the discharge passage formed between the outer wall 29 and the adjacent tank wall, into the pan 18 from which it flows through the conduit 17 and through the inlet opening 11 of the mixing drum into the latter. The water and charge are thus delivered simultaneously to the mixing drum, with the result that the mixing operation takes place without delay. The discharge passage from the tank is, of course, made sufficiently large to insure that the tank will be empty by the time the charging materials have left the hopper 14; and when said hopper is restored to its lower position, the tank is simultaneously tipped back to its filling position, with the consequent opening of the inlet valve, as hereinbefore explained.

I claim:

1. In a concrete mixing machine, a mixing drum, a batch hopper, elevating means for lifting said batch hopper into dumping position with respect to said mixing drum, a measuring tank pivotally mounted for movement with respect to said batch hopper and adapted for the reception of water, means connecting said tank with said batch hopper for moving said tank about its pivotal support whereby the contents of said tank are dumped when said batch hopper is lifted, and means for directing the dumped contents of said tank into said mixing drum.

2. In a concrete mixing machine, a mixing drum, a batch hopper, elevating means for lifting said batch hopper into dumping position with respect to said mixing drum, a measuring tank pivotally mounted for movement with respect to said batch hopper and adapted for the reception of water, means connecting said tank with said batch hopper for moving said tank about its pivotal support whereby the contents of said tank are dumped when said batch hopper is lifted, a conduit leading to said mixing drum, and a water deflecting guard carried by said tank and adapted to receive and direct the dumped contents of said tank into said conduit.

3. In a concrete mixing machine, a mixing drum, a batch hopper, elevating means for lifting said batch hopper into dumping position with respect to said mixing drum, a measuring tank pivotally mounted for movement with respect to said batch hopper and adapted for the reception of water, means connecting said tank with said batch hopper for moving said tank about its pivotal support whereby the contents of said tank are dumped when said batch hopper is lifted, a conduit leading to said mixing drum, a water deflecting guard secured to the exterior of said tank and forming with said tank a passage open at its lower end and communicating at its upper end with the upper end of said tank, said passage being adapted to receive the dumped contents of said tank and direct said contents into said conduit.

4. In a concrete mixing machine, a mixing drum, a batch hopper, elevating means for lifting said batch hopper into dumping position with respect to said mixing drum, a measuring tank pivotally mounted for movement with respect to said batch hopper and adapted for the reception of water, means connected with and actuated by said batch hopper for periodically tipping said tank, means for directing the contents of said tank into said mixing drum, an inlet valve for said tank, valve-actuating means for closing said valve upon entrance of a predetermined quantity of water into said tank, and valve-actuating means for opening said valve upon return of said tank to filling position after dumping.

5. In a concrete mixing machine, a mixing drum, a batch hopper, elevating means for lifting said batch hopper into dumping position with respect to said mixing drum, a measuring tank pivotally mounted for movement with respect to said batch hopper and having an inlet opening adapted to permit entrance of water into said tank, means connecting said tank with said batch hopper whereby said tank is tipped when said batch hopper is lifted, a valve for said inlet opening, a pressure chamber containing said valve and adapted to communicate with a source of water supply and with said tank, float-actuated means for closing said valve, and automatically-actuated valve-operating means for opening said valve against the water pressure in said pressure chamber after the contents of said tank have been dumped and upon the return of said tank to its filling position, and means for directing the dumped contents of said tank into said mixing drum.

In testimony whereof, I have affixed my signature to this specification.

GEORGE T. ALLEN.